US012413886B1

(12) United States Patent
Mayaka

(10) Patent No.: US 12,413,886 B1
(45) Date of Patent: Sep. 9, 2025

(54) NOISE MUFFLER FOR MICROPHONE

(71) Applicant: Amazon Technologies, Inc., Seattle, WA (US)

(72) Inventor: Charles Mayaka, Brooklyn, NY (US)

(73) Assignee: Amazon Technologies, Inc., Seattle, WA (US)

(*) Notice: Subject to any disclaimer, the term of this patent is extended or adjusted under 35 U.S.C. 154(b) by 218 days.

(21) Appl. No.: 18/300,272

(22) Filed: Apr. 13, 2023

Related U.S. Application Data

(60) Provisional application No. 63/489,386, filed on Mar. 9, 2023.

(51) Int. Cl.
*H04R 1/08* (2006.01)
*H04R 1/28* (2006.01)

(52) U.S. Cl.
CPC ........... *H04R 1/083* (2013.01); *H04R 1/2876* (2013.01); *H04R 2410/07* (2013.01)

(58) Field of Classification Search
None
See application file for complete search history.

(56) References Cited

U.S. PATENT DOCUMENTS

2005/0271233 A1* 12/2005 Uchimura .............. H04R 1/086 381/359
2021/0245675 A1* 8/2021 Yoshino .............. B60R 11/0247

* cited by examiner

*Primary Examiner* — Kenny H Truong
(74) *Attorney, Agent, or Firm* — Knobbe, Martens, Olson & Bear, LLP

(57) ABSTRACT

A noise muffler for a microphone includes a circumferential sidewall, a shroud, a hollow support stem, and a sponge. The circumferential sidewall extends from a rear wall and includes a curved inner surface. The shroud extends from at least a portion of the circumferential sidewall and comprises a curved outer surface and a curved inner surface. The hollow support stem extends from a generally central location of the rear wall and is aligned with an opening in the rear wall. The support stem includes a plurality of openings uniformly positioned around an outer surface of the support stem. The sponge is disposed around the support stem and conforms with the curved inner surface of the shroud and the curved inner surface of the sidewall. The shroud and the sponge deflect airflow away from the opening in the rear wall.

20 Claims, 8 Drawing Sheets

NOISE MUFFLER FOR MICROPHONE

BACKGROUND

Microphones are used in various environments, including outdoor environments with varying wind conditions. In addition to capturing the intended sound (e.g., a person speaking), microphones capture noises caused by external factors such as wind generated turbulence. The noise caused by external factors interferes with the quality of the intended sound being captured by the microphone, affecting the quality of the sound profile captured by the microphone.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure generally relates to noise mufflers for use with microphones, specifically microphones used in outdoor environments where air flow, such as wind, can interfere with the intended sound (e.g., a person speaking) being captured by the microphone. Air flow caused by wind can be unpredictable and constantly varying. The direction of air flow can constantly change, for example, air flow can be left to right and then switch to right to left or any other direction. As air flows over non-aerodynamic surfaces, turbulence is generated which in turn generates noise that is collected as part of the sound wave profile. Proximity of the turbulence to a microphone can drastically affect the sound profile. When air flow interferes with the sound being captured by a microphone, the microphone may no longer work for its intended purpose. Therefore, it is desirable to have noise mufflers capable of reducing, limiting, or preventing noises from outside sources, such as air flow and wind, to be captured by the microphone.

The present disclosure relates to aerodynamic deflection based on air flow characteristics over a generally cylindrical, generally spherical, and/or aerodynamic body. The generally cylindrical, generally spherical, and/or aerodynamic body can reduce and/or eliminate the turbulence that leads to wind noise perturbations. In some instances, the generally cylindrical, generally spherical, and/or aerodynamic body can cause the turbulence to occur farther downfield away from the sound receiving microphone, allowing for clearer capture of the desired sound by the microphone. Additionally, the noise mufflers according to the present disclosure provide for an amplification effect from an inside curvature that is capable of concentrating the intended sound waves towards the receiving microphone.

The noise mufflers according to the present disclosure may be used with exterior microphones, such as microphones in outdoor environments that experience air flow caused by wind. One specific non-limiting example includes microphones at entrance and/or exit gates of a facility that are used to communicate with drivers of vehicles attempting to enter and/or exit the gates. A remote agent may rely on the use of a microphone to communicate with the driver of the vehicle and therefore there is a need to reduce or eliminate the turbulence caused by wind the microphone may be exposed to. If the turbulence is not reduced and/or eliminated, a person located at the facility may need to stop what they are doing to travel to the entrance and/or exit gate to communicate with the driver in person. Additional, non-limiting examples of use include microphones at drive through restaurants, microphones mounted on vehicles, and microphones used in outdoor environments (e.g., outside buildings). Therefore, it is desirable to implement noise mufflers according to the present disclosure to improve the quality of the sound captured by exterior microphones.

Figure 1B:
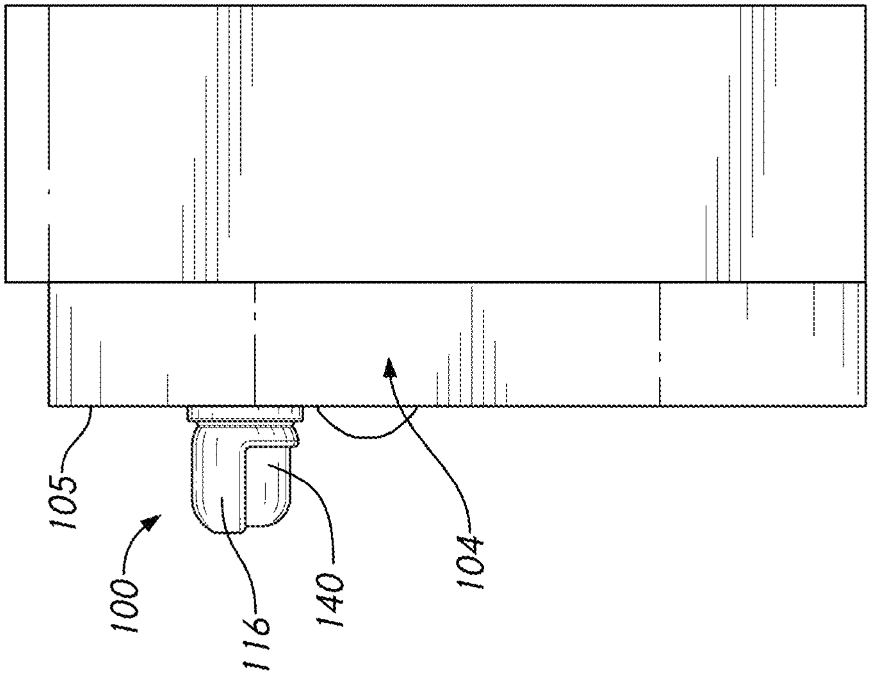
FIG. 1B is a side view of the object of FIG. 1A.
Figure 1A:
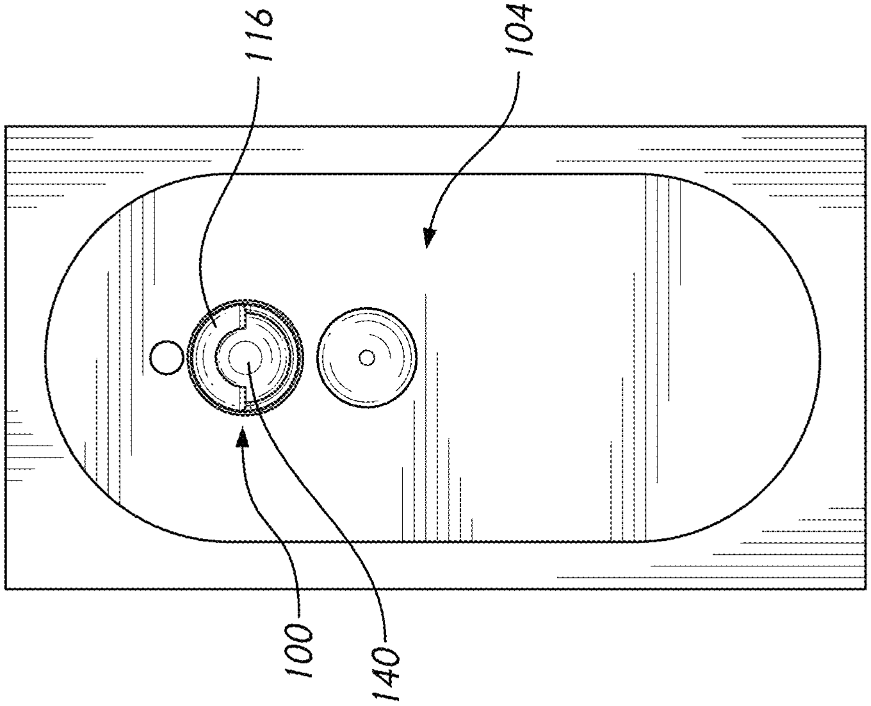
FIG. 1A is a front view of an object having a noise muffler for a microphone.

FIGS. 1A-11 show various views of a noise muffler 100. FIGS. 1A and 1B are front and side views of the noise muffler 100 mounted to an object 104. The object 104 can be any object that includes a microphone, for example a communication box at an entrance and exit gate that includes a microphone to communicate with a driver of a vehicle attempting to enter and/or exit the gate. The object 104 may be any object 104 that experiences air flow or unexpected wind that may interfere with the sound that is intended to be identified by the microphone. As shown in FIG. 1B, the noise muffler 100 can extend away from a front surface 105 of the object 104, allowing air flow to flow over, under, and/or around the noise muffler 100.

Figure 2:
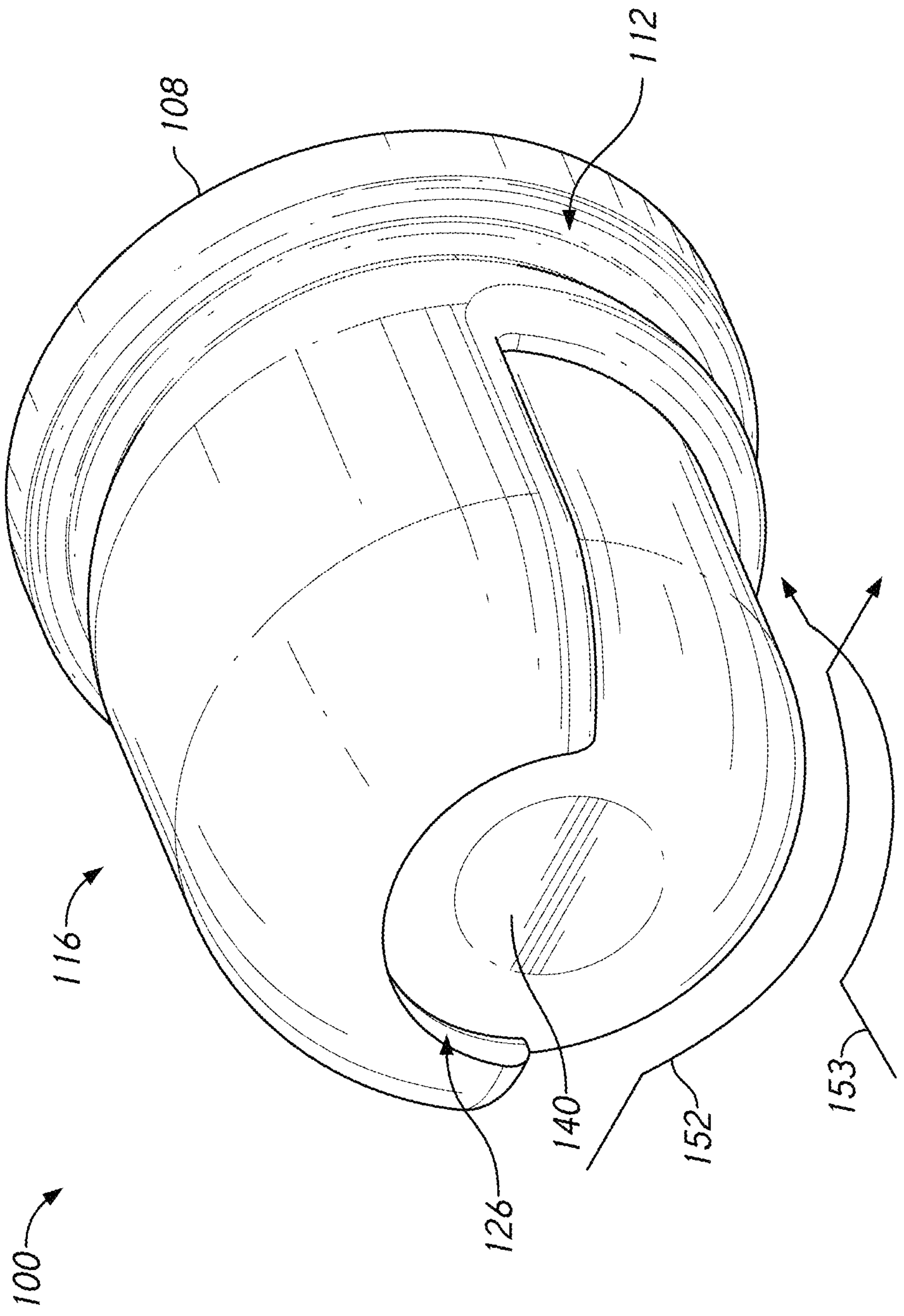
FIG. 2 is a perspective view of a noise muffler for a microphone.
Figure 3:
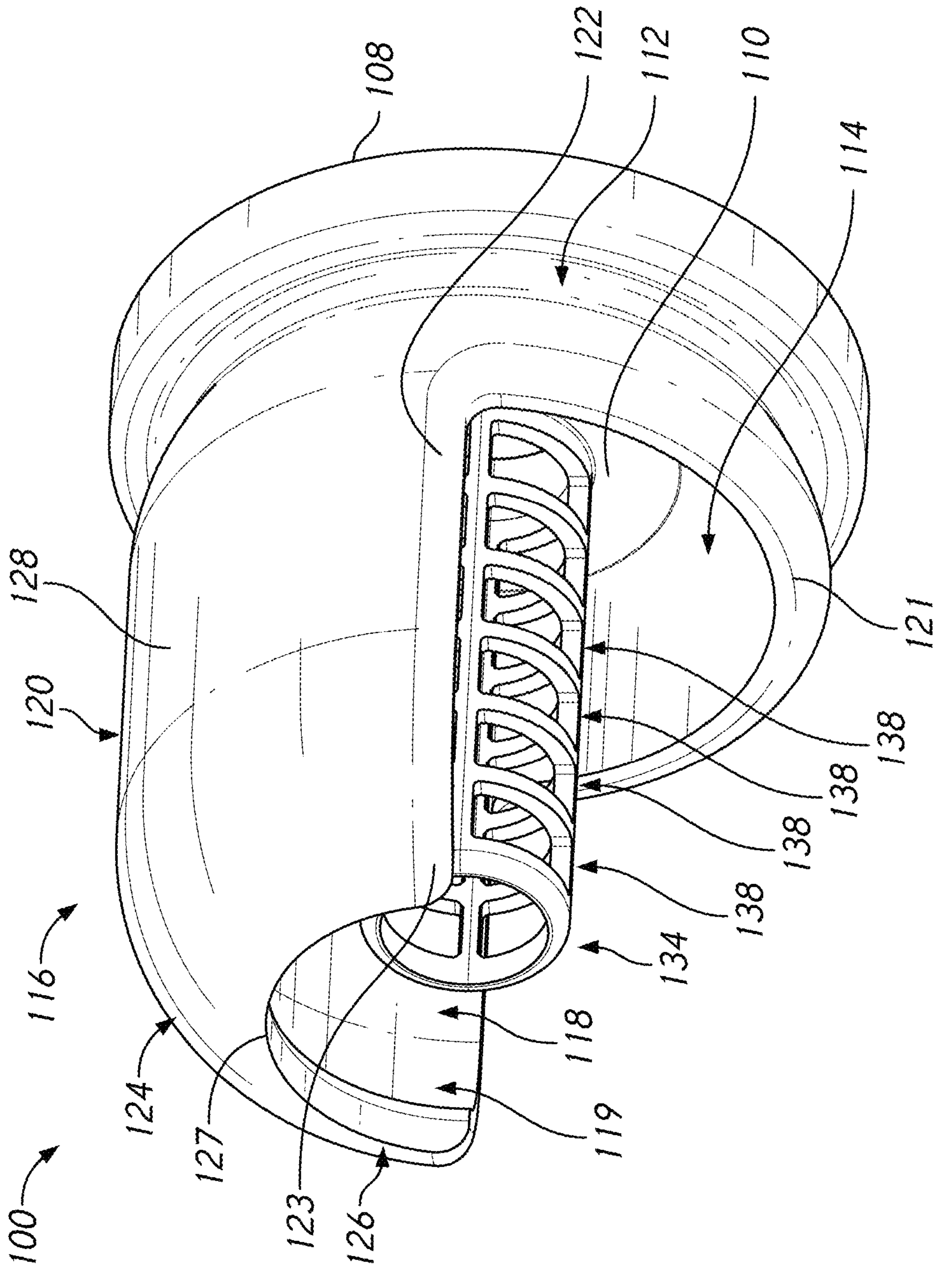
FIGS. 3 and 4 are perspective views of the noise muffler of FIG. 2 with a sponge removed for illustrative purposes.
Figure 4:
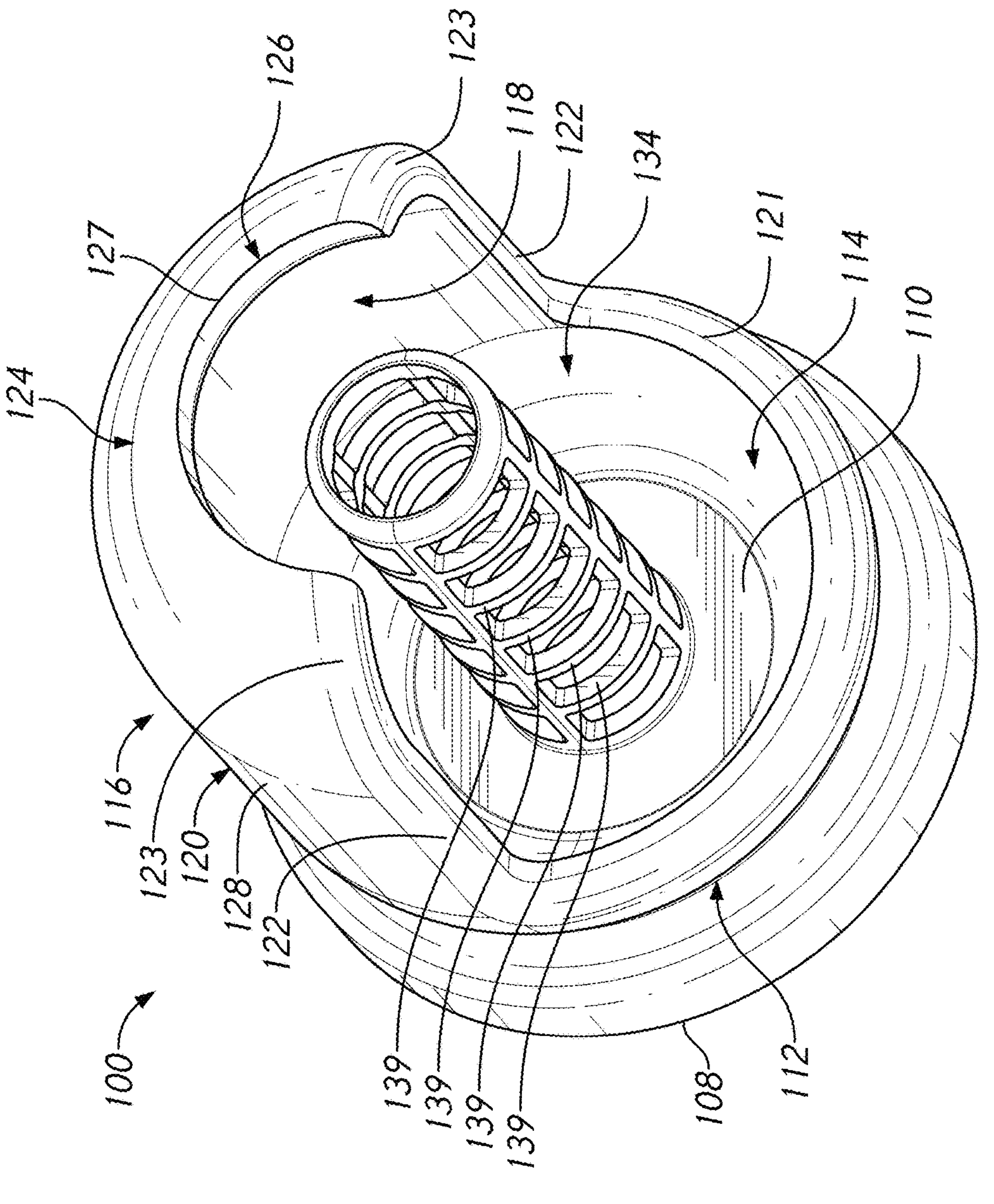
Figure 6:
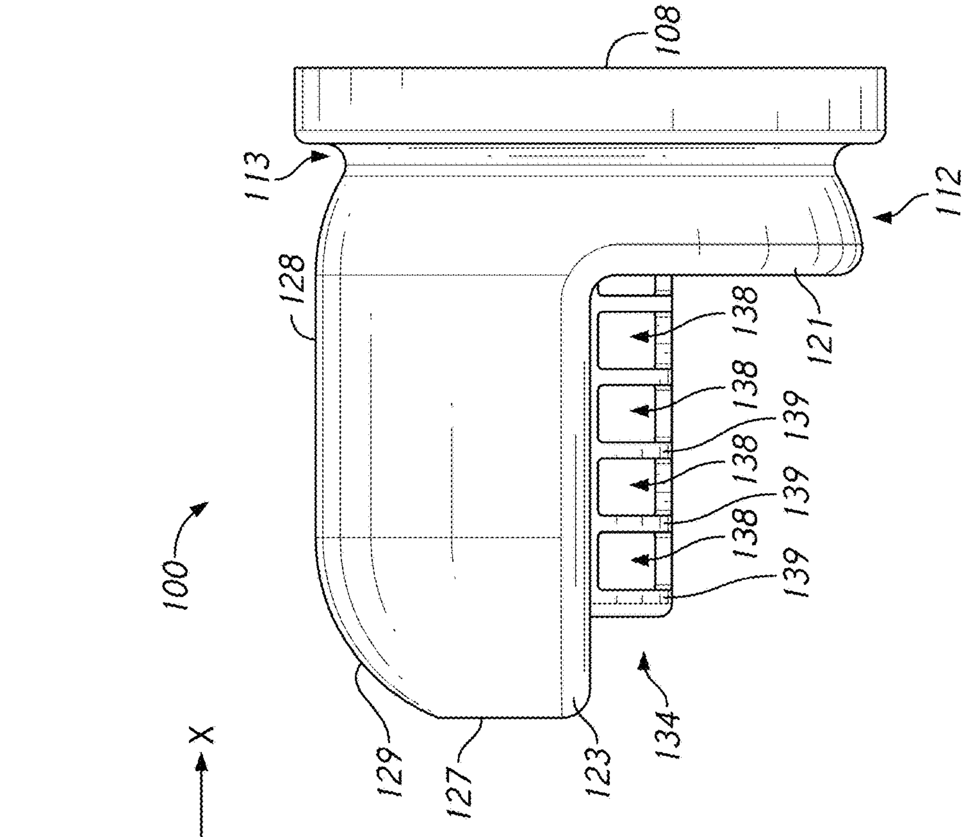
FIGS. 5 and 6 are side views of the noise muffler of FIG. 2 with the sponge removed for illustrative purposes.
Figure 5:
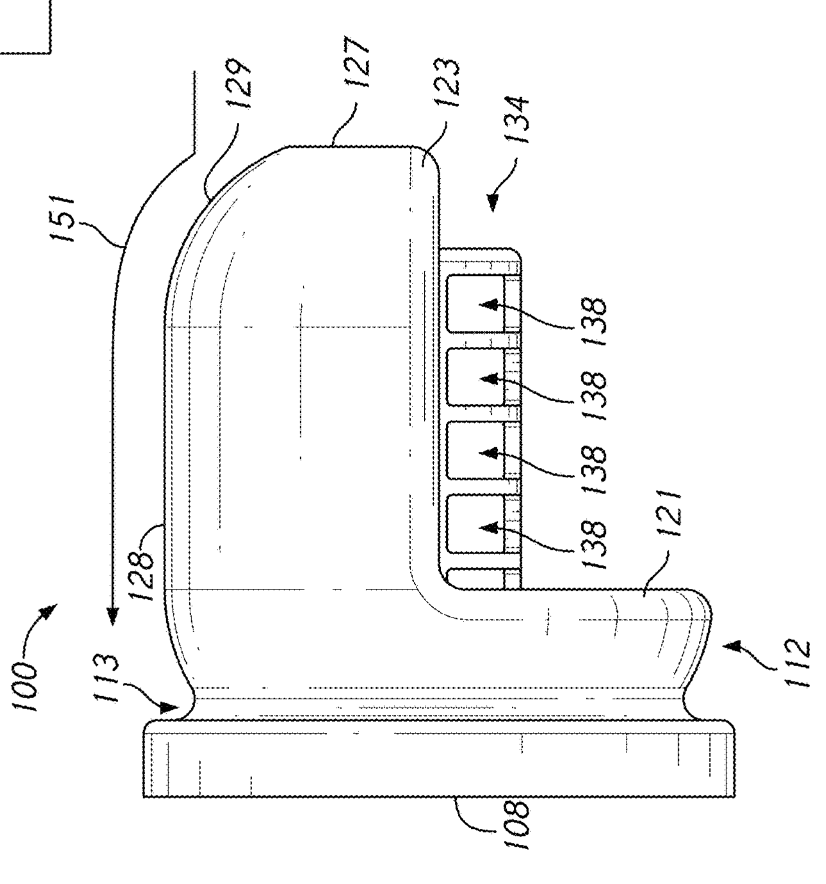

FIGS. 2-4 are perspective views of the noise muffler 100. The noise muffler 100 can include a rear wall 108, a sidewall 112 extending from the rear wall 108, a shroud 116 and a support stem 134. A microphone 102 can in one example be positioned parallel to the rear wall 108, for example as labeled in FIG. 8. In some embodiments, the microphone 102 can be adjacent and/or next to the noise muffler 100. In some embodiments, the microphone 102 can be flush with the rear wall 108 of the noise muffler 100. In some embodiments, the microphone can be positioned linearly offset from the opening 103. In some embodiments, the microphone can be positioned directly behind or aligned with the opening 103. The rear wall 108 can couple or attach the noise muffler 100 to the object 104. In some embodiments, the rear wall 108 can have a generally circular cross-section. In some embodiments, the sidewall 112 can have a generally circular cross-section (e.g., can extend circumferentially about an axis of the noise muffler 100). The sidewall 112 and the rear wall 108 can be connected via a curved transition wall 113, for example as shown in FIGS. 5 and 6 illustrating side views of the noise muffler 100. In some embodiments, the curved transition wall 113 can be generally U-shaped. The curved transition wall 113 can decrease in diameter from the rear wall 108 to the start of the sidewall 112. The diameter of the sidewall 112 can gradually increase from the curved transition wall 113 away from the rear wall 108. In some embodiments, the sidewall 112 and the rear wall 108 can be connected without the curved transition wall 113. For example, the sidewall 112 may extend from the shroud 116 and continue on a curved path away from a central axis A1 (as labeled in FIG. 11) to the rear wall 108.

Figure 11:
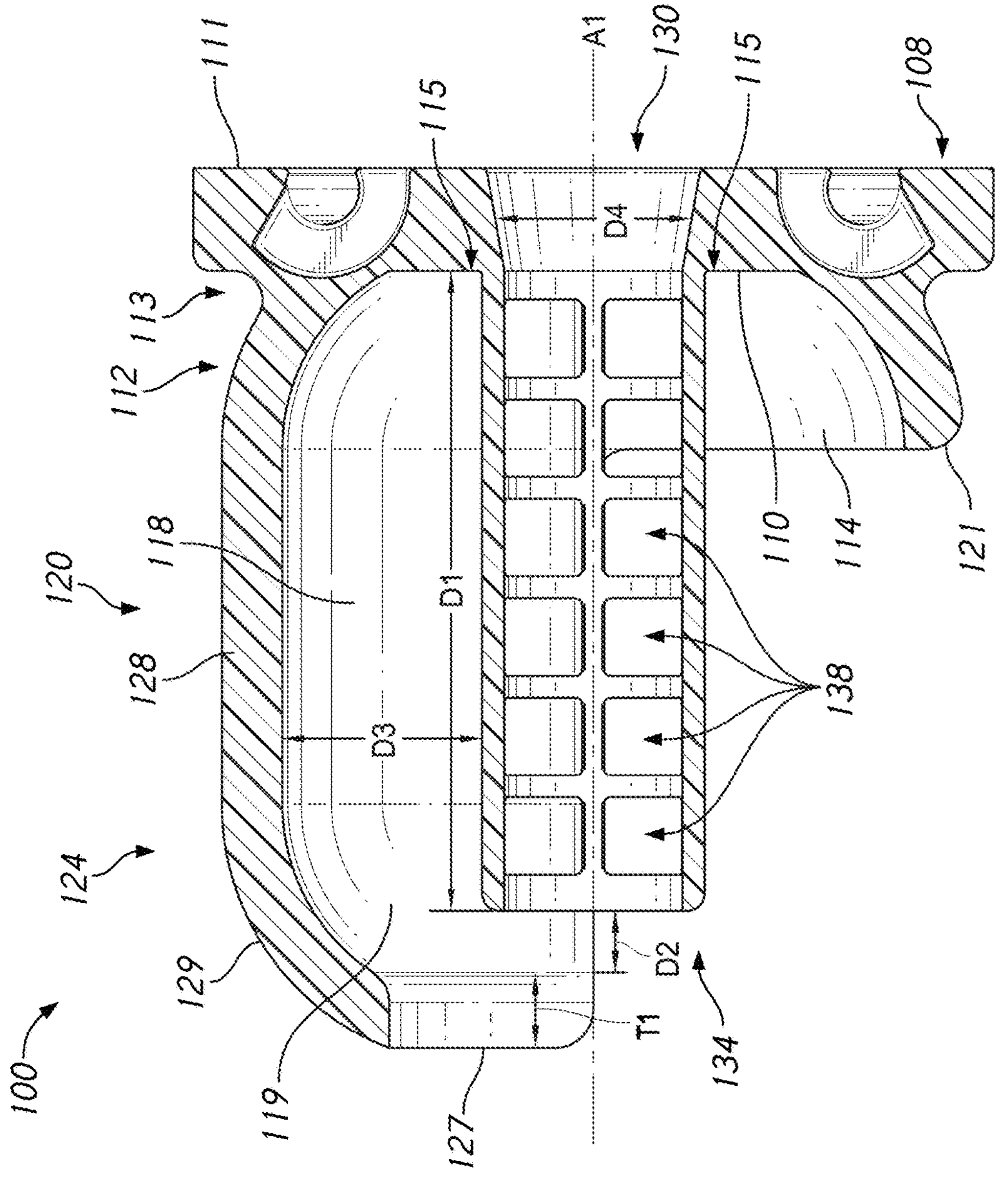
FIG. 11 is a cross-sectional view of the noise muffler of FIG. 2 with the sponge removed for illustrative purposes.

The sidewall 112 can have an inner surface 114, for example as shown in FIGS. 3, 4, and 11. The inner surface 114 can advantageously be shaped to direct sound waves toward the microphone 102. In one example, the inner surface 114 can have a curvature, such as a spherical curvature, which directs sound toward the microphone 102. In another example, the inner surface 114 can have a conical shape that directs sound toward the microphone 102. The inner surface 114 can extend from an outer end of the sidewall 112 to the rear wall 108. In some embodiments, the inner surface 114 can extend from the outer end of the sidewall 112 to a location 115 (as labeled in FIG. 11) where the support stem 134 extends from the rear wall 108. In some embodiments, a front surface 110 of the rear wall 108 can be generally flat, for example, as shown in FIG. 11. In some embodiments, the front surface 110 of the rear wall 108 can be curved, for example, the inner surface 114 of the sidewall 112 can have the same curvature as the front surface 110 of the rear wall 108, forming a generally semi-spherical shape. The inner surface 114 can advantageously create an amplification effect that concentrates sound waves towards the microphone 102. In some embodiments, the sidewall 112 can include a curved, rounded, or tapered front end 121.

The noise muffler 100 can include the shroud 116 extending from the sidewall 112. The shroud 116 can include a first portion 120 and a second portion 124. The first portion 120 of the shroud 116 can extend at a first end from the sidewall 112. In some embodiments, the first portion 120 of the shroud 116 can extend from a portion of the sidewall 112 positioned above horizontal axis 117, as labeled in FIG. 7. In some embodiments, the first portion 120 of the shroud 116 can extend from a portion of the sidewall 112 and have a generally semi-circular cross-section. The first portion 120 of the shroud 116 can have a curved outer surface 128 and a curved inner surface 118 forming a generally semi-cylindrical shape. The first portion 120 can be generally C-shaped. The first portion 120 can have an arch shape. In some embodiments, end walls 122 of the first portion 120 of the shroud can be curved, rounded, or tapered.

The second portion 124 of the shroud 116 can extend from a second end of the first portion 120 of the shroud 116. The second portion 124 of the shroud 116 can have a generally quarter spherical shape. For example, the second portion 124 can have an outer curved surface 129 (e.g., defined by a spherical curvature) extending in the X-direction, as labeled in FIG. 5, and in the Y-direction, as labeled with reference to FIG. 7. The outer curved surface 129 can align (e.g., tangentially) with the outer surface 128 of the first portion 120 to provide a continuous outer surface for the shroud. In one example, the curved outer surface 129 can be a spherical curvature. The curved outer surface 129 can extend toward the horizontal axis 117, as labeled in FIG. 7. The second portion 124 of the shroud 116 can include a curved inner surface 119. In some embodiments, end walls 123 of the second portion 124 of the shroud can be curved, rounded, or tapered.

The curved transition wall 113, the sidewall 112, and the shroud 116 when viewed together can define a generally spherical or spheroid shape. In some embodiments, the curved transition wall 113, the sidewall 112, and the shroud 116 when viewed together can form a capsule shape having two semi-spherical ends and a semi-cylindrical or cylindrical body in between the two semi-spherical ends.

In some embodiments, the second portion 124 can have a cut-out 126 in a forward facing surface of the shroud 116, for example, as shown in FIGS. 2-4 and 7. The cut-out 126 can be defined by an edge 127, as shown in FIG. 5. The edge 127 can extend along a plane. The cut-out 126 can be generally semi-circular in shape. The cut-out 126 can allow for straight sound transmission to a receiving microphone. In some embodiments, the edge 127 of the cut-out 126 can be sharp (e.g., not rounded or curved). The sharp edge 127 can prevent rain, snow, or other precipitation from entering the noise muffler by directing the rain, snow, or other precipitation downward so that it falls to the ground.

The noise muffler 100 can include a support stem 134 extending from the front surface of the rear wall 108, for example as shown in FIGS. 5, 6, and 11. The support stem 134 can extend a distance D1 (as labeled in FIG. 11). The distance D1 can be less than a distance from the from the front surface 110 of the rear wall 108 to the edge 127 of the cutout 126. In some embodiments, there may be a distance D2 (as labeled in FIG. 11) defined by an end of the support stem 134 and an inner wall of the shroud 116. An outer surface of the support stem 134 and inner surfaces 114, 118, 119 may define a distance D3. The distance D3 may vary along the distance D1 (e.g., the length) of the support stem 134. The distances D2 and D3 may allow room for a sponge to be disposed over the support stem 134, as described in more detail below.

Figure 8:
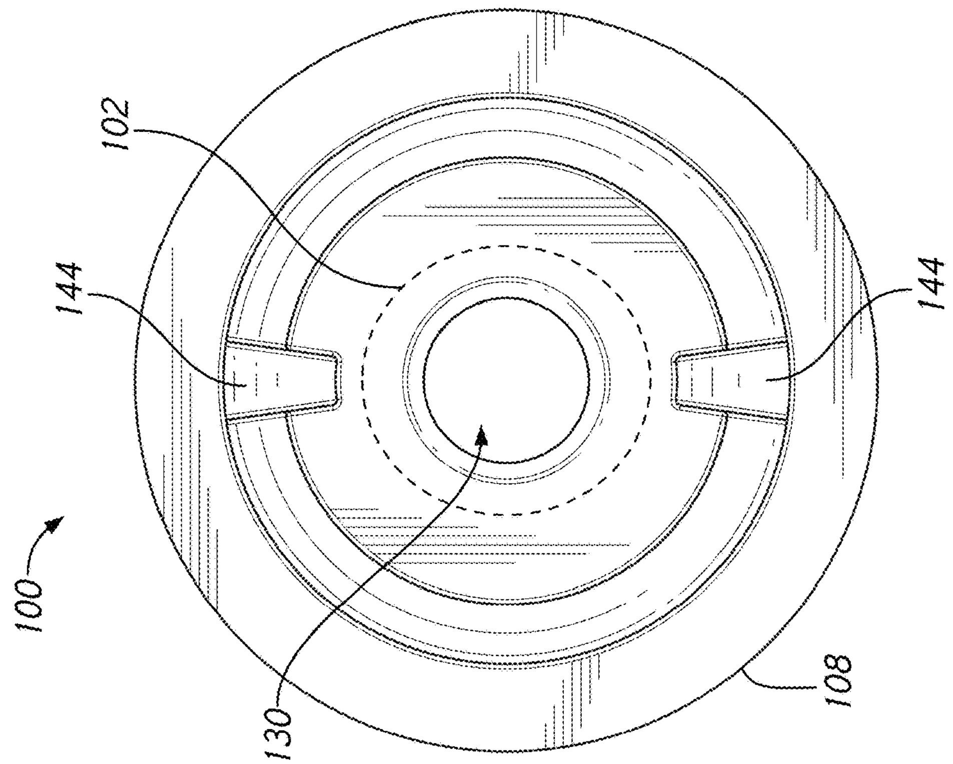
FIG. 8 is a rear view of the noise muffler of FIG. 2 with the sponge removed for illustrative purposes.
Figure 7:
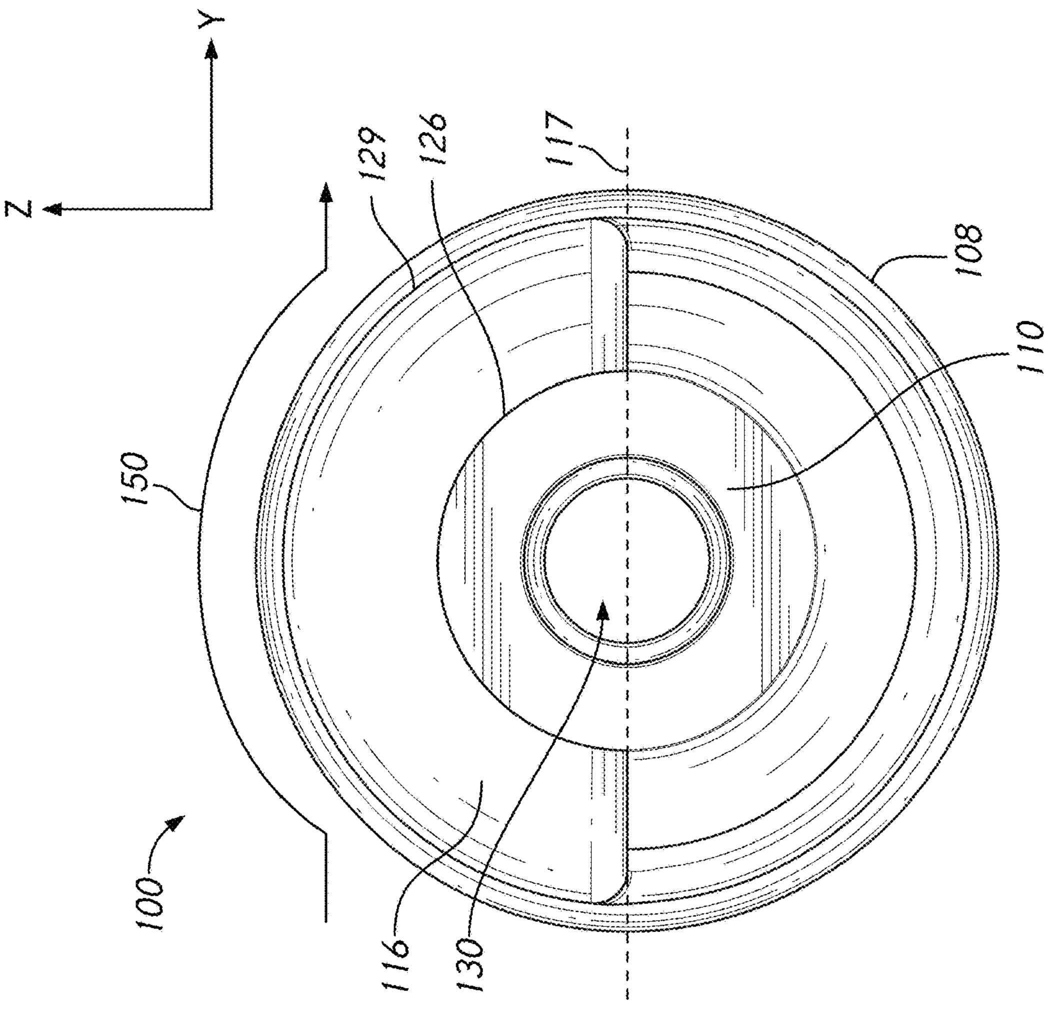
FIG. 7 is a front view of the noise muffler of FIG. 2 with the sponge removed for illustrative purposes.
Figure 10:
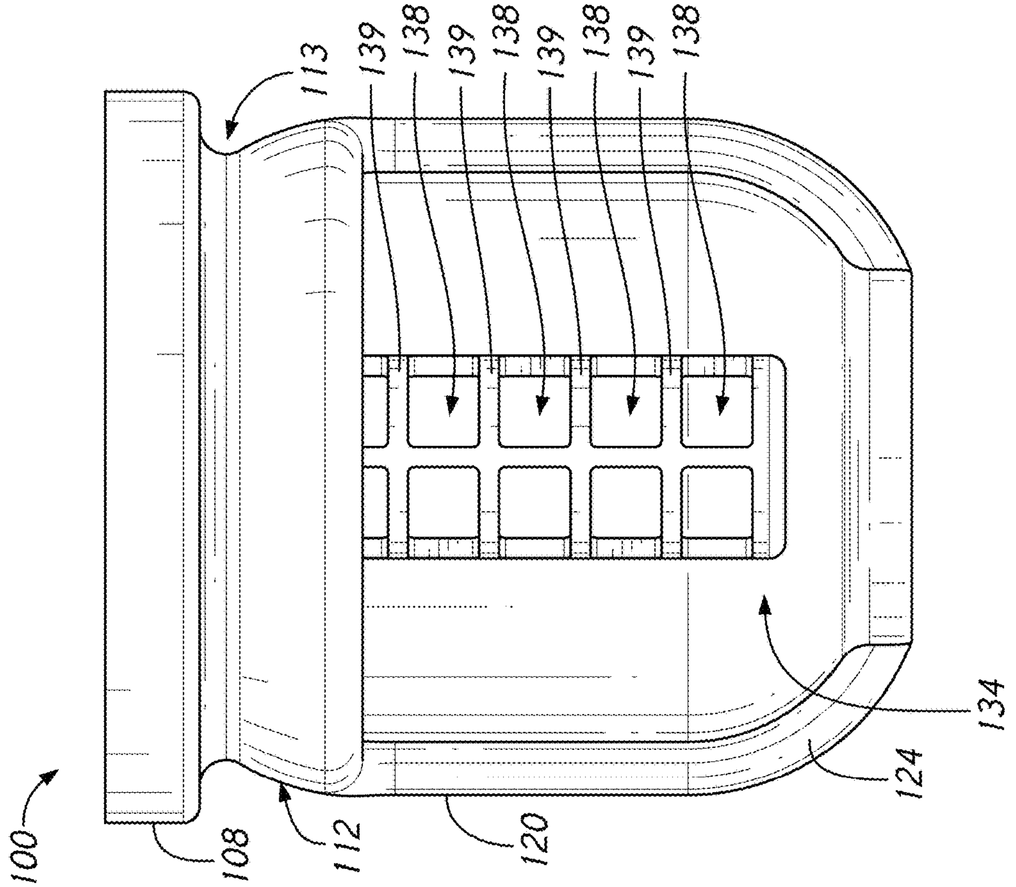
FIG. 10 is a bottom view of the noise muffler of FIG. 2 with the sponge removed for illustrative purposes.
Figure 9:
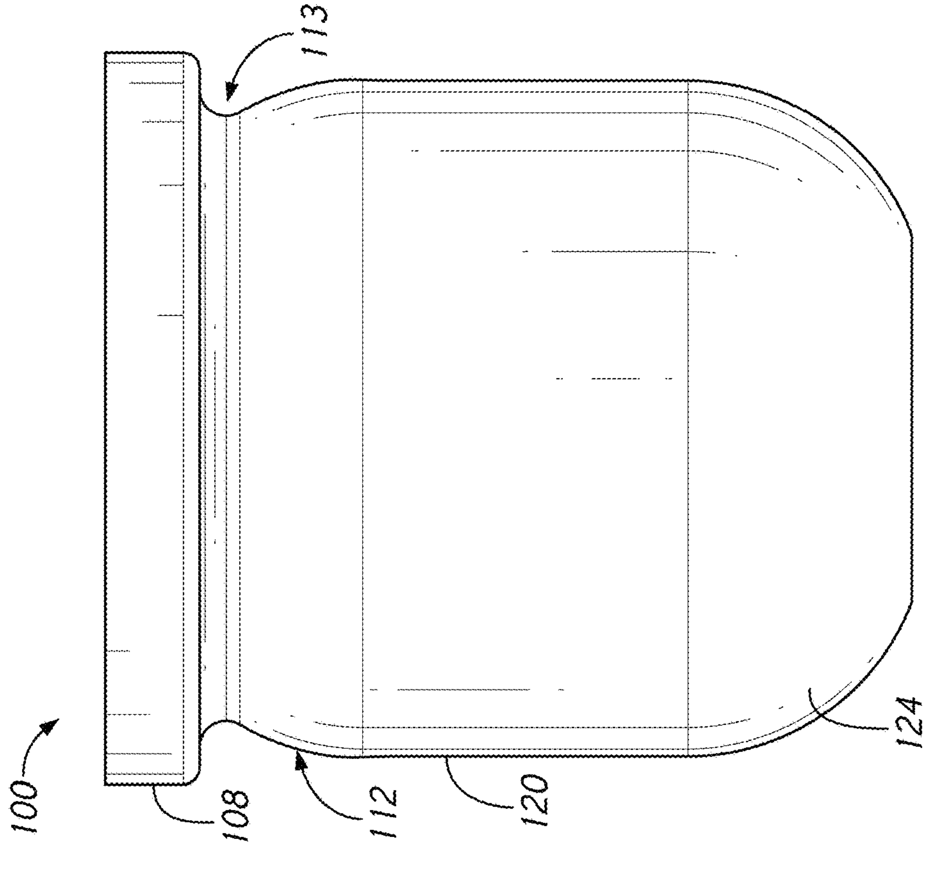
FIG. 9 is a top view of the noise muffler of FIG. 2.

The support stem 134 can be aligned with an opening 130. The opening 130 can extend from a rear surface 111 to a front surface 110 of the rear wall 108, for example as shown in FIGS. 7, 8, and 11. The opening 130 can be positioned in a generally central location of the rear wall 108 in an area surrounded by the perimeter of the sidewall 112. In some embodiments, the opening 130 can be circular in shape. In some embodiments, a diameter D4 of the opening 130 may increase from the front surface 110 of the rear wall 108 to a rear surface 111 of the rear wall 108, as shown in FIG. 11. In some embodiments, the opening 130 can be conical or tapered (e.g., to allow sufficient room for the microphone so that rear wall 108 does not obstruct or cover the microphone). In other embodiments, the opening 130 can be cylindrical (e.g., have a constant diameter D4). The shape of the opening 130 (e.g., conical, tapered, cylindrical) can help direct the intended sound toward the microphone (e.g., microphone 102). For example, in embodiments where the microphone is positioned linearly offset from the opening 130, the opening 130 being tapered can assist in directing the intended sound toward the microphone. In embodiments, where the microphone is positioned behind or aligned with the opening 130, the opening 130 being cylindrical can assist in directing the intended sound toward the microphone.

The support stem 134 can be hollow and form a channel that is aligned with the opening 130. The support stem 134 can be centrally located on the rear wall 108. In some embodiments, the support stem 134 can include a plurality of openings 138 (see FIGS. 5-6, 10, 11) in communication (e.g., fluid communication) with the channel of the support stem 134 and in communication with the opening 130 (e.g., so that air or sound can flow through the openings 138 into the channel of the support stem 134 and into the opening 130). The plurality of openings 138 can be uniformly spaced circumferentially and linearly along the support stem 134. In some embodiments, the plurality of openings 138 can form one or more rows of openings 138 extending along the length of the support stem 134. In some embodiments, the plurality of openings 138 can form one or more rings of openings 138 extending around the perimeter of the support stem 134. The plurality of openings 138 extend from an outer surface of the support stem 134 to an inner surface of the support stem 134. In some embodiments, the openings 138 may be generally rectangular in shape, although other shapes are possible.

The plurality of openings 138 can form connectors 139 that form the support stem 134. The connectors 139 can be thin structures that define the support stem 134 walls. The size and shape of the connectors 139 can be dependent upon the size and shape of the openings 138. In some embodiments, the connectors 139 may be generally linear. In some embodiments, at least one connector 139 may extend generally parallel to a central axis A1 (as labeled in FIG. 11) of the noise muffler 100. In some embodiments, at least one connector 139 may extend generally perpendicular to the central axis A1 of the noise muffler 100. The combination of the plurality of openings 138 and the connectors 139 can increase the structural strength of the support stem 134 and prevent or inhibit damage to the support stem 134.

In some embodiments, a sponge 140, as shown in FIGS. 1A, 1B and 2, can be disposed over the support stem 134. The sponge 140 can be made of foam or other suitable sponge material (e.g., a material that is compressible, resilient and has favorable acoustic properties). The general central location of the support stem 134 on the rear wall 108 can assist in centralizing the sponge 140 and assist in maintaining the positioning of the sponge 140 (e.g., within the shroud 116). Additionally, the support stem 134, the shroud 116, and/or the sidewall 112 can function together to prevent or reduce the chance that the sponge 140 is blown away by wind in an outdoor environment. For example, the location of the stem 134 on the rear wall 108, the spacing of the stem 134 from the shroud 116, and the size of the sponge 140 can facilitate retaining the sponge 140 between the shroud 116 and the stem 134. The sponge 140 can have a generally cylindrical shape.

The sponge 140 can be generally spherical or conical in shape. The sponge 140 can correspond to the curvature of the inner surface 114 of the sidewall 112 and the curved inner surfaces 118, 119 of the shroud 116. In some embodiments, the sponge 140 can conform to the general shape of the inner surface 114 of the sidewall 112 and the curved inner surfaces 118, 119 of the shroud 116. An outer surface of the sponge 140 can come in contact with the inner surface 114 of the sidewall 112 and the curved inner surfaces 118, 119 of the shroud 116 and can also come in contact with an outer surface of the support stem 134. In one example, the sponge 140 has a thickness (e.g., an uncompressed thickness) approximately equal to the distance D3. In another example, the sponge 140 has a thickness (e.g., an uncompressed thickness) greater than the distance D3, so that the sponge 140 is compressed between the support stem 134 and the curved inner surfaces 118, 119 when disposed over the support stem 134. The thickness of the sponge 140 and/or the contact between the sponge 140 and the inner surfaces 114, 118, 119 can assist in maintaining the shape of the sponge 140 and in retaining the sponge 140 on the stem 134 to inhibit or prevent the sponge 140 from being blown off the stem 134 by wind. In some embodiments, the shroud 116, the sidewall 112, and the sponge 140 can function as a single cylindrical, spherical, and/or aerodynamic structure. For example, the curvature of the shroud 116, sidewall 112, and sponge 140 can essentially form a spherical, cylindrical, and/or aerodynamic shape when assembled together. This can allow the air flow to be directed away from the receiving microphone (e.g., microphone 102) and thus reduce or prevent any turbulence generated noise from being captured by the receiving microphone.

In some embodiments, the thickness T1 (as labeled in FIG. 11) of the shroud 116 may be minimized such that the edge 127 and the outer surface of the sponge 140 are almost continuous. The thickness T1 being minimized can allow for the edge 127 of the shroud 116 and the outer surface of the sponge 140 to be approximately tangential. Minimizing the distances D2, D3 can provide for minimal space within an area defined by the shroud 116 and sidewall 112. In some embodiments, it can be beneficial to minimize the thickness T1 and/or the distances D2, D3 to improve the quality of the intended sound traveling to the microphone (e.g., microphone 102) by deflecting airflow over the shroud 116 and sponge 140 to minimize turbulent air flow near the noise muffler 100 that can affect (e.g., reduce) the quality of the sound captured by the microphone.

The shroud 116 can protect the sponge 140 from water damage due to rain, snow, or other weather conditions. The shroud 116 can cover a top surface of the sponge 140. The shroud 116 can at least partially cover side surfaces of the sponge 140. The shroud 116 can at least partially cover a front surface of the sponge 140. The sponge 140 can be removable and/or replaceable from the noise muffler 100.

In some embodiments, the noise muffler 100 can include one or more recesses 144 configured to mount the noise muffler 100 to the object 104, for example, as shown in FIG. 8. The recesses 144 can be sized and shaped to mount the noise muffler 100 to protrusions extending from the object 104.

During use, the noise muffler 100 can deflect and/or redirect airflow perturbations. For example, the cylindrical, spherical, and/or aerodynamic shape of the noise muffler 100 can redirect the airflow away from the receiving microphone (e.g., the microphone 102). For example, using a left to right air flow as a non-limiting example, arrow 150 in FIG. 7 illustrates how air flow can approach the noise muffler 100, engage the shroud 116, travel over the shroud 116 and away from the receiving microphone. Another non-limiting example of air flow traveling towards the front end of the noise muffler 100 is illustrated by arrow 151 in FIG. 5. As shown, air flow can approach the noise muffler 100 from the front, engage the shroud 116, travel over the shroud 116 and away from the receiving microphone. The sponge 140 can function in a similar way as the shroud 116 in directing air flow away from the receiving microphone. For example, as shown by arrows 152 and 153 in FIG. 2, air flow approaching the sponge 140, from either the front or side can be directed away from the receiving microphone.

While certain embodiments of the inventions have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A noise muffler for a microphone comprising:

a circumferential sidewall extending from a rear wall, the circumferential sidewall comprising a curved inner surface;

a shroud extending from at least a portion of the circumferential sidewall, the shroud comprising a curved outer surface and a curved inner surface; and a sponge disposed around a support stem extending from the rear wall, wherein the sponge conforms with the curved inner surface of the shroud and the curved inner surface of the circumferential sidewall, wherein the shroud is configured to deflect airflow away from a microphone.

2. The noise muffler of claim 1, wherein the sponge is removable from the support stem.

3. The noise muffler of claim 1, further comprising a hollow support stem extending from the rear wall, the hollow support stem comprising a plurality of openings uniformly positioned around an outer surface of the hollow support stem.

4. The noise muffler of claim 1, further comprising the microphone, wherein the microphone is positioned parallel with the rear wall.

5. The noise muffler of claim 1, wherein a front end of the shroud comprises a cut-out.

6. The noise muffler of claim 1, wherein the shroud has a semi-circular cross-sectional shape.

7. A noise muffler for a microphone comprising:

a circumferential sidewall extending from a rear wall, the circumferential sidewall comprising a curved inner surface;

a shroud extending from at least a portion of the circumferential sidewall, the shroud comprising a curved outer surface and a curved inner surface; and a hollow support stem extending from the rear wall, the hollow support stem comprising a plurality of openings uniformly positioned around an outer surface of the hollow support stem, wherein the shroud is configured to deflect airflow away from a microphone.

8. The noise muffler of claim 7, further comprising the microphone, wherein the microphone is positioned parallel with the rear wall.

9. The noise muffler of claim 7, wherein a front end of the shroud comprises a cut-out.

10. The noise muffler of claim 7, wherein the shroud has a semi-circular cross-sectional shape.

11. The noise muffler of claim 7, further comprising a sponge disposed around a support stem extending from the rear wall.

12. The noise muffler of claim 11, wherein the sponge is removable from the support stem.

13. A noise muffler for a microphone comprising:

a circumferential sidewall extending from a rear wall, the circumferential sidewall comprising a curved inner surface; and a shroud extending from at least a portion of the circumferential sidewall, the shroud comprising a curved outer surface and a curved inner surface, the curved outer surface and the curved inner surface defining a C-shaped cross-section;

wherein the shroud is configured to deflect airflow away from a microphone.

14. The noise muffler of claim 13, further comprising a sponge at least partially surrounded by the shroud.

15. The noise muffler of claim 14, wherein the sponge conforms with the curved inner surface of the shroud and the curved inner surface of the circumferential sidewall.

16. The noise muffler of claim 14, further comprising a support stem extending from the rear wall, wherein the sponge is removable from the support stem.

17. The noise muffler of claim 13, further comprising a hollow support stem extending from the rear wall, the hollow support stem comprising a plurality of openings uniformly positioned around an outer surface of the hollow support stem.

18. The noise muffler of claim 13, further comprising the microphone, wherein the microphone is positioned parallel with the rear wall.

19. The noise muffler of claim 13, wherein a front end of the shroud comprises a cut-out.

20. The noise muffler of claim 13, wherein the shroud has a semi-circular cross-sectional shape.

* * * * *